Patented Apr. 4, 1939

2,152,656

UNITED STATES PATENT OFFICE 2,152,656

INSULATOR FOR SPARK PLUGS

Taine G. McDougal, Albra H. Fessler, and Karl Schwartzwalder, Flint, Mich., assignors to General Motors Corporation, Detroit, Mich, a corporation of Delaware No Drawing. Application March 31, 1937, Serial No. 134,125

8 Claims. (Cl. 106—12)

This invention has to do with ceramic bodies especially adapted for use as insulators for spark plugs of internal combustion engines. These bodies possess in high degree the properties required for such use, such as resistance to heat shock, good electrical resistance both at normal and elevated temperatures, mechanical strength, good thermal conductivity and resistance to acids and alkalies, etc.

When fired to a dense non-porous state the improvide bodies are characterized by a mineralogical structure consisting of spinel and corundum.

The term "spinel" denotes a compound of the formula $RO.R_2O_3$. In the spinel dealt with, the RO group is represented by manganese, cobalt and nickel oxides and the $R_2O_3$ group by aluminum oxide. Spinels possess the perfect symmetry of the isometric crystal system. These spinels have a high thermal coefficient of expansion, a high thermal conductivity, good mechanical strength, resistance to the attack of acids, alkalies, and ordinary fusing agents, high melting points, etc. The disadvantage of the spinels for use as spark plug insulators is their low resistance to heat shock.

We have found it possible to overcome this latter deficiency, i. e., to increase the resistance to thermal shock by adding alumina in excess of that required to form spinel. The excess alumina crystallizes as corundum yielding a dense, non-porous structure consisting of spinel and corundum.

The presence of the corundum not only decreases the breakage due to heat shock but increases the thermal conductivity of the body, a characteristic highly desired in spark plug insulators. The disadvantage of too much corundum lies in the fact that as the alumina content increases, the temperature required to produce a non-porous body increases.

The RO oxides which give desirable results are manganese, cobalt and nickel.

In the case of the manganese oxide in addition to forming spinel a very small portion is taken into solid solution in the excess corundum. The cobalt and nickel oxides do not appear to do this but form only spinel.

Our experiments have shown that in the case of manganese oxide it is desirable to have less than 75% of the spinel $MnO.Al_2O_3$ in the final product,—that is, more than 25% corundum,— in order to have good resistance to heat shock. In the case of cobalt and nickel oxides the spinel content should be less than 60%, and the corundum content greater than 40%.

Expressed in terms of oxide content the amount of manganese oxide employed in the body should preferably be not less than 0.5% nor more than 30%. The amount of nickel or cobalt oxide should preferably be not less than 0.5% nor more than 25%.

The RO oxides used are finely ground coloring oxides known to the ceramic trade. The oxides are preferably free from alkalies in order to eliminate their deleterious effect on the hot dielectrical properties of the insulator. The alumina used is 1200° C. calcined aluminum oxide that has been acid treated to remove as much soda as possible.

The oxides are ground and thoroughly mixed. The grinding is preferably carried to a point where all of the material is in the form of a fine powder, for example, one capable of passing through a 325 mesh screen. These materials may be ground in a steel mill since whatever slight contamination may result from grinding would form spinels on firing which would react in the same manner as the inorganic compounds that have been purposely added.

Molding of the insulators may be accomplished with the aid of a suitable binding as described and claimed in the application of Karl Schwartzwalder, Serial No. 3,465, filed January 25, 1935; by pressing in rubber molds as described and claimed in the prior application of Albra H. Fessler and Ralston Russell, Jr., Serial No. 28,630, filed June 27, 1935 now Patent No. 2,091,973; by casting, or by any other of the known methods used in forming bodies from non-plastic materials. The first mentioned method has been found to be preferable because the resulting insulator possesses a smooth, glossy surface requiring no glaze.

The formed bodies are then fired to a suitable temperature to produce recrystallization to the extent that the bodies are non-porous, and this usually is accompanied by considerable shrinkage. The firing time and temperature must be controlled as a usual kiln practice so as to secure complete recrystallization, non-porosity and to avoid overfiring with resultant blistering or warpage or other injury to the product. With bodies herein disclosed firing temperatures between Cone 30 and 35 i. e., 1730 to 1830° C. are adequate. Whether firing is to be done under oxidizing, reducing or neutral conditions will depend somewhat on the inorganic compound employed. In general, the atmosphere prevailing during that stage of the firing wherein the maturing temperatures are actually approached determines the rate of volatilization of the inorganic compound, and it is desirable to select that atmosphere which will reduce volatilization. The firing temperature likewise affects the color of the resulting product because of chemical reactions which may take place under certain conditions For the most part, it has been found preferable to employ an oxidizing atmosphere.

The properties of the insulators vary, of course, with the inorganic compound or mixtures thereof that are employed, and also with the quantities used. However, all of the insulators embodying this invention are characterized by superior thermal conductivity compared to present day porcelain. They are likewise characterized by high mechanical strength, good electrical resistance at both low and elevated temperatures, and good resistance to heat shock.

In addition to the spinels mentioned above it is to be anticipated that similar results would be obtained by employing other inorganic compounds which possess the property of forming spinels.

The invention is susceptible of considerable modification. Thus, if desired, the mixtures of the indicated inorganic compounds may be employed. It may be found desirable to add to the bodies suitable ceramic fluxes. Desirable results have been obtained with additions of 1 to 5% flux.

If desired, the ware, such as spark plug insulators, may be composed only in part of the group composition. Thus, either the tip or the butt or the shoulder of a spark plug insulator may be made of one composition, while the rest of the insulator is made of another composition integrally or otherwise joined to it.

We claim:

1. A spark plug insulator made by recrystallizing into a dense, non-porous structure aluminum oxide together with .5% or more of an inorganic compound of the group comprising manganese oxide, nickel oxide and cobalt oxide.

2. A spark plug insulator made by recrystallizing into a dense, non-porous structure aluminum oxide together with from .5% to 30% of an inorganic compound of the group comprising manganese oxide, nickel oxide and cobalt oxide.

3. A spark plug insulator made by firing to vitrification a finely ground non-plastic mixture of alumina, together with .5% or more of an inorganic compound of the group comprising manganese oxide, and cobalt oxide.

4. A spark plug insulator made by firing to temperatures on the order of from 1730 to 1830° C., a finely ground non-plastic mixture of alumina, together with .5% or more of an inorganic compound of the group comprising manganese oxide, nickel oxide and cobalt oxide.

5. A spark plug insulator in the form of a dense, non-porous mass consisting of intimately mingled corundum and spinel formed from alumina and manganese oxide.

6. A spark plug insulator in the form of a dense, non-porous mass consisting of intimately mingled corundum and spinel formed from alumina and manganese oxide, the spinel comprising not more than 75% of the insulator.

7. An electrical insulator for spark plugs and the like characterized by high thermal conductivity, high mechanical strength, good resistance to corrosion and to heat shock, and good electrical resistance at both low and elevated temperatures, made by firing to temperatures on the order of from Cone 30 to Cone 35 to a non-porous state, a body formed from a mixture of aluminum oxide and from .5% to on the order of 25% of an oxide of the group consisting of manganese oxide, nickel oxide and cobalt oxide, the mixture being ground to pass a screen on the order of 325 mesh, substantially all of the added oxide appearing in the final body in the form of spinel, and the alumina being substantially in excess of that required to form spinel.

8. An electrical insulator for spark plugs and the like characterized by high thermal conductivity, high mechanical strength, good resistance to corrosion and to heat shock, and good electrical resistance at both low and elevated temperatures, made by firing to temperatures on the order of from Cone 30 to Cone 35 to a non-porous state, a body formed from a mixture of aluminum oxide and from .5% to on the order of 25% of manganese oxide, the mixture being ground to pass a screen on the order of 325 mesh, substantially all of the added oxide appearing in the final body in the form of spinel, and the alumina being substantially in excess of that required to form spinel.

TAINE G. McDOUGAL.
ALBRA H. FESSLER.
KARL SCHWARTZWALDER.